3,269,923
STEAM DISTILLATION OF CARBAMATE AND
ALCOHOL MIXTURES
Andre Eugene Noel Roche, Toulouse, Jean Louis Emile Pomot, Neuilly-sur-Seine, and Emmanuel Jean Francois Luzarreta and Gilbert Guy Justin Cousserans, Toulouse, France, assignors to Office National Industriel de l'Azote, Toulouse, France, a corporation of France
Filed Dec. 28, 1962, Ser. No. 248,118
Claims priority, application France, Jan. 2, 1962, 4,762
8 Claims. (Cl. 203—48)

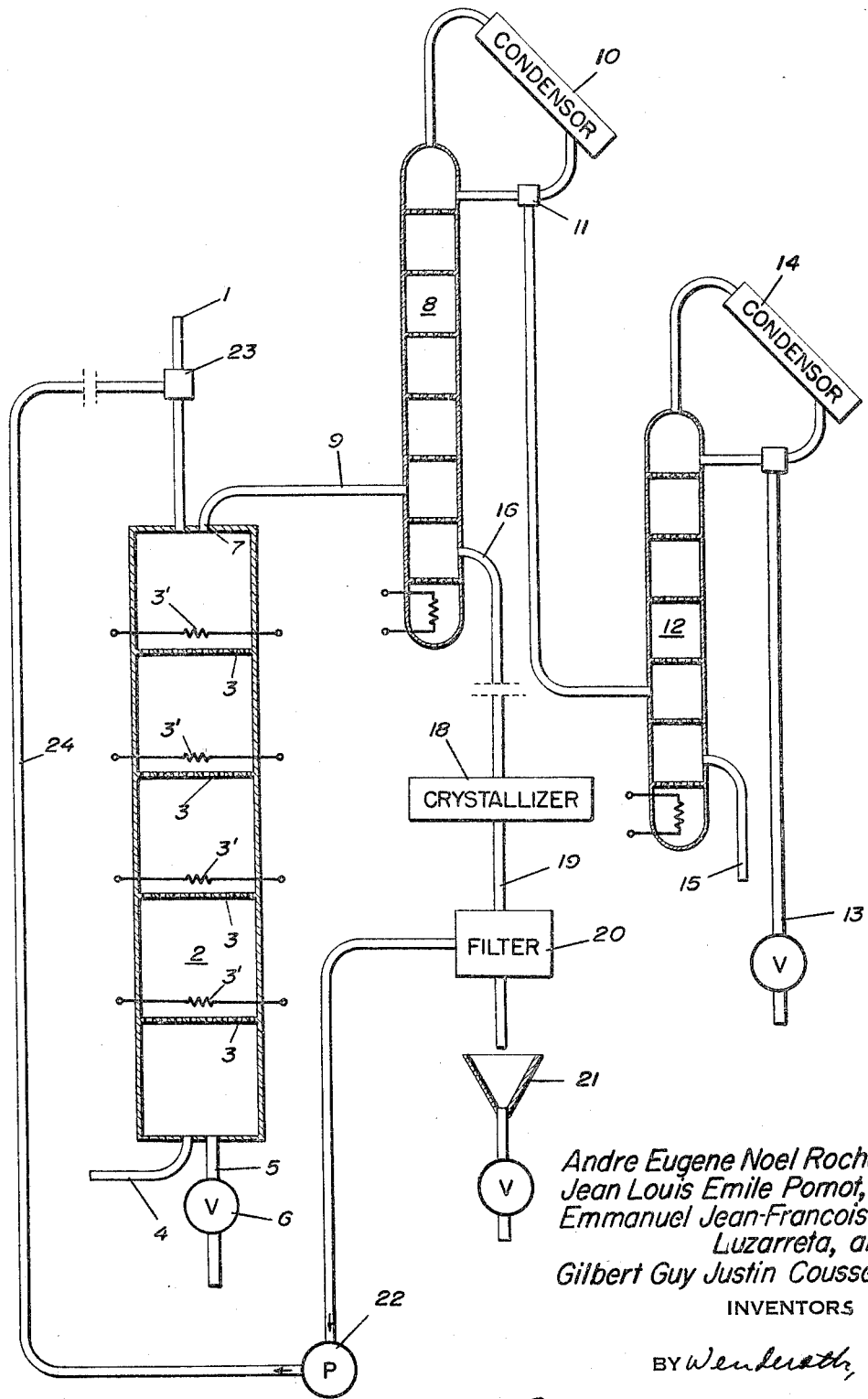
Andre Eugene Noel Roche,
Jean Louis Emile Pomot,
Emmanuel Jean-Francois
Luzarreta, and
Gilbert Guy Justin Cousserans
INVENTORS

United States Patent Office 3,269,923
Patented August 30, 1966

The present invention relates to a new and useful distillation procedure, more especially adapted for the recovery of carbamic acid esters in the synthesis thereof.

Numerous procedures have been described for the production of carbamic acid esters by the catalyzed or uncatalyzed reaction of urea or a salt thereof with the corresponding alcohol. In these prior processes, the crude product is usually treated, after elimination of excess alcohol, with a suitable selective solvent in order to insolubilize the impurities, after which the carbamic acid esters are extracted by distillation under atmospheric pressure or under reduced pressure.

The carrying out of this mode of separation entails major disadvantages such as the necessity of providing considerable, and usually valuable, factory space to accommodate the large, and correspondingly expensive, apparatuses required by the complicating factor that means have to be provided for the recovery of the solvent, all of which appreciably detracts from the possibility and feasibility of economically practicing such procedure.

The present invention has for its principal object the embodiment of the separation of carbamic acid esters contained in the crude synthesis product, without having to resort to the use of selective solvents. Briefly stated, this object is realized essentially by subjecting an alcoholic solution of the crude synthesis product to steam distillation, in the course of which the impurities are continuously separated, the desired carbamate being entrained, this being followed by distillation and, depending upon circumstances, by crystallization of so-obtained pure carbamate from a concentrated aqueous solution thereof free from the aforesaid impurities. The alcohol is recovered by rectification and is recycled for use with fresh crude synthesis product or in the synthesis itself.

The procedure according to the present process is carried out, in principle, in three successive stages, to which it may in some cases be advantageous to adjoin a supplementary stage of crystallization of the carbamic acid ester:

(1) The alcoholic solution of carbamic acid ester coming from the synthesis—after having been freed, when necessary, of $NH_3$ which it may contain and having brought to atmospheric pressure—is subjected to entrainment by steam. This entrainment operation is carried out in such manner that the resultant gaseous phase contains all the alcohol and the carbamic acid ester in admixture with water. The liquid phase consists of an aqueous solution containing all the impurities, constituted for the most part by more or less resinified organic by-products and, depending upon circumstances, by ammoniacal salts and by catalyst, if any.

(2) The gaseous phase coming from the zone of entrainment by steam passes into a rectification zone where it is separated into a head fraction constituted by alcohol and water, free from carbamate, and into a tail fraction constituted by a concentrated aqueous solution of carbamate free from impurities.

(3) The aqueous alcoholic solution obtained by condensing the head fraction from the rectification zone is subjected to a second rectification, the alcohol thus separated being recycled for re-use with fresh crude carbamate.

(4) The concentrated aqueous carbamate solution coming from the first stage of rectification is used directly or is crystallized, in the cold, if desired under reduced pressure, and after filtration and/or drying, the crystallized carbamic acid ester is recovered in essentially pure form.

When the concentrated aqueous carbamate solution, with its relatively small content of water, can be utilized directly, the crystallization stage is superfluous and may be omitted, whereupon the process of the invention will comprise only the first three described stages.

The process of the present invention is applicable generally in connection with all processes for the manufacture of esters of carbamic acid from urea or a salt thereof (such as the nitrate, hydrochloride, etc.) and a monoalcohol of the aliphatic series, cycloaliphatic series or araliphatic series (such e.g. as ethyl alcohol, butyl alcohol, allyl alcohol, cyclohexanol, benzyl alcohol, etc.) regardless of whether or not the synthesis is catalytic or non-catalytic. It is especially applicable to the continuous synthesis process disclosed in French Patent No. 1,235,-953 which involves the reaction of urea nitrate and a $C_1$ to $C_6$ monoalcohol in the presence of zinc oxide.

The accompanying figure of drawing shows, by way of illustration, a diagrammatic representation of a presently preferred installation for carrying out the process of the invention.

The crude alcoholic solution, coming from the synthesis apparatus (not shown) and containing the carbamic acid ester to be separated, is fed continuously through conduit 1 to a steam distillation column 2 provided with heated perforated plates 3, at the bottom of column 2, via conduit 4. The number of plates 3 and the relative proportion of steam supplied are such that the liquid phase withdrawn continuously at the base of column 2 via conduit 5, provided with control valve 6, contains the totality of the impurities in aqueous solution. Conventional heating elements are shown at 3'.

The gaseous phase leaving the entrainment column 2 at 7 contains the totality of carbamic acid ester and of alcohol, in admixture with water vapor. It is supplied by way of conduit 9 to rectification column 8, and there is separated into a head fraction, constituted by alcohol and by water free from carbamic acid ester, and into a tail fraction, constituted by concentrated aqueous solution of carbamic acid ester.

The head fraction is condensed in condenser 10 and the water-alcohol mixture, continuously withdrawn at 11, is subjected to further rectification in rectification column 12, from which there is continuously withdrawn—after condensation in condenser 14—the pure alcohol or, depending upon circumstances, a water-alcohol azeotrope, which is recycled via conduit 13 to the carbamate synthesis zone. Water is withdrawn by way of conduit 15 at the base of column 12.

The tail fraction withdrawn at the bottom of rectification column 8, by way of conduit 16, can, optionally, be utilized directly. However, if it be desired to recover the pure carbamic acid ester in solid crystalline form, the concentrated aqueous solution withdrawn at 16 is introduced at 17 into crystallizer 18, which is suitably cooled, for example by refrigeration under reduced pressure.

The mass of crystals of carbamic acid ester in the water coming from the crystallizer 18 is continuously withdrawn through conduit 19 which conveys it to filtering device 20 wherein, if desired, the crystals may also be dried.

The essentially pure crystals of carbamic acid ester are collected in hopper 21, from which they are sent to storage after having been air-dried, if necessary.

The cold aqueous solution, saturated with carbamic acid ester, is withdrawn from the outlet of filter 20 by pump 22, and is re-introduced, by way of conduit 24, into the entrainment column 2, at 23.

The following example illustrates how the invention may be carried out with reference to the aforesaid apparatus. The example sets forth a presently preferred embodiment of the process. However, both the process and the apparatus are intended to be merely exemplary of and not limitative of the invention. Percentages are by weight.

*Example*

A crude alcoholic solution of ethyl carbamate, which is derived by synthesis according to the process of the hereinbefore-identified French patent, has—after elimination of $NH_3$ and after being brought down to atmospheric pressure—the following composition:

| | Percent |
|---|---|
| Ethyl carbamate | 14.8 |
| Ethyl alcohol | 64.2 |
| Water | 3.4 |
| Ammonium nitrate | 13.9 |
| Zinc nitrate | 1.6 |
| Organic impurities | 2.1 |

This solution, heated to about 80° C., is fed continuously, at the rate of 290 kg./hour, to an entrainment column 2 provided with four plates 3. The plate temperatures are successively 117° C., 120° C., 125° C. and 133° C., the lowermost plate having the lower temperature. By opening valve 6, there is withdrawn from the bottom of the column, 80 kg./hour of a mixture of the following composition:

| | Percent |
|---|---|
| Ethyl carbamate | 0 |
| Ethyl alcohol | 0 |
| Water | 36.3 |
| Ammonium nitrate | 50.4 |
| Zinc nitrate | 5.8 |
| Organic impurities | 7.5 |

The vapor phase, free from impurities, which is obtained at the head of the entrainment column 2, is continuously fed to the rectification column 8, the heater temperature of which is kept at 117° C., and there is withdrawn from the bottom of the column 8, through conduit 16, 47 kg./hour of a mixture of about the following composition:

| | Percent |
|---|---|
| Ethyl carbamate | 90.5 |
| Water | 9.4 |
| Ethyl alcohol | 0.1 |

The head fraction from column 8 and consisting of water and ethyl alcohol goes, via conduit 11, into the second rectification column 12, the heater temperature of which is at about 100° C. There is withdrawn from column 12, 190 kg./hour of 95% ethyl alcohol, and this is cycled back for re-use in the synthesis zone.

The concentrated aqueous solution of ethyl carbamate is sent either to storage, as such, or is subjected to the crystallizing and solid-liquid-separation operations previously described, the mother liquors from the crystallization being recycled to the supply conduit at the top of column 2. In this second case there is obtained 42.3 kg./hour of pure ethyl carbamate, which corresponds to an overall yield (separation) of 98.5%.

Steam is of course supplied at the bottom of column 2 as previously described.

The water-vapour/ethyl carbamate ratio is 3.9 and corresponds to a water-vapour flow of 167 kg./hour, the plates of column 2 being 250 mm. apart one from another.

The figures of the example have been experimentally determined but, of course, they can also be obtained by calculation, as a function of flows of feed materials and their vapour pressure at the temperature used.

Having thus disclosed the invention, what is claimed is:

1. A continuous process for the separation of carbamic acid ester from the crude alcoholic solution thereof obtained by reaction between (a) a member selected from the group consisting of urea and salts thereof and (b) a member selected from the group consisting of the aliphatic, cycloaliphatic and araliphatic monohydric alcohols, said process comprising subjecting the said crude alcoholic solution to distillation with steam, whereby the totality of impurities present in the crude solution is separated, and thereafter recovering the resultant impurity-free alcohol, water and carbamic acid ester by rectification, the ester being obtained in the form of a concentrated aqueous solution thereof.

2. A continuous process according to claim 1, wherein the pure crystalline carbamic acid ester is recovered by subjecting the concentrated aqueous solution thereof to crystallization.

3. A continuous process according to claim 1, wherein the crude alcoholic solution is steam distilled in a vertical entrainment zone comprising a plurality of spaced superposed perforated plates by passing said solution downward through said plates in said zone in countercurrent relationship to an upwardly streaming current of steam, the temperatures of the several plates being successively higher from the lowermost to the uppermost plate, the number of plates and the proportion of steam being so correlated to the downwardly flowing crude solution that the liquid fraction leaving the said zone at the bottom thereof contains the totality of the impurities contained in the starting crude alcoholic solution, whereby the vapor phase withdrawn at the head of the zone consists of impurity-free carbamic acid ester, water and alcohol.

4. A continuous process according to claim 1, wherein the carbamic acid ester is lower alkyl carbamate and the alcohol is lower alkanol.

5. A continuous process according to claim 1, wherein the carbamic acid ester is ethyl carbamate and the alcohol is ethanol.

6. In a method for recovering carbamic acid ester from a crude alcoholic solution thereof obtained by reaction between (a) a member selected from the group consisting of urea and salts thereof and (b) a member selected from the group consisting of the aliphatic, cycloaliphatic and araliphatic monohydric alcohols, the improvement wherein the said solution is subjected to the action of an entraining agent for the ester and for the alcohol while continuously passing said solution and entraining agent in countercurrent relationship through an entraining zone, whereby constituents of said solution other than alcohol and said ester are not entrained by said agent and are thereby separated from the alcohol and ester which are removed together with entraining agent.

7. A continuous process according to claim 6, wherein the carbamic acid ester is lower alkyl carbamate and the alcohol is lower alkanol.

8. A continuous process according to claim 6, wherein the carbamic acid ester is ethyl carbamate and the alcohol is ethanol.

References Cited by the Examiner

UNITED STATES PATENTS

| 2,834,799 | 5/1958 | Sowa | 260—482 X |
| 2,837,561 | 6/1958 | Beinfest | 260—482 |
| 3,013,065 | 12/1961 | Beinfest | 260—482 |
| 3,013,074 | 12/1961 | Beinfest | 260—482 |

NORMAN YUDKOFF, *Primary Examiner.*

J. B. DONIHEE, *Assistant Examiner.*